United States Patent
Yatsu et al.

(10) Patent No.: US 9,521,586 B2
(45) Date of Patent: Dec. 13, 2016

(54) MOBILE COMMUNICATION SYSTEM, COMMUNICATION SYSTEM, NODE, FLOW-CONTROL NETWORK, AND COMMUNICATION-CONTROL METHOD

(71) Applicant: NTT DOCOMO, INC., Chiyoda-ku (JP)

(72) Inventors: Bunpei Yatsu, Chiyoda-ku (JP); Takahiro Yamazaki, Chiyoda-ku (JP); Motoshi Tamura, Chiyoda-ku (JP); Tetsuya Nakamura, Chiyoda-ku (JP); Shigeru Iwashina, Chiyoda-ku (JP); Takashi Shimizu, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 63 days.

(21) Appl. No.: 14/382,176

(22) PCT Filed: Feb. 20, 2013

(86) PCT No.: PCT/JP2013/054205
§ 371 (c)(1),
(2) Date: Aug. 29, 2014

(87) PCT Pub. No.: WO2013/129207
PCT Pub. Date: Sep. 6, 2013

(65) Prior Publication Data
US 2015/0009934 A1  Jan. 8, 2015

(30) Foreign Application Priority Data

Mar. 2, 2012  (JP) ................................. 2012-046809

(51) Int. Cl.
*H04W 28/12* (2009.01)
*H04L 29/06* (2006.01)
(Continued)

(52) U.S. Cl.
CPC .............. *H04W 28/12* (2013.01); *H04L 45/74* (2013.01); *H04L 47/14* (2013.01);
(Continued)

(58) Field of Classification Search
CPC ............... H04L 65/1016; H04L 65/104; H04L 65/1069; H04L 65/1006; H04L 45/38; H04L 45/745; H04M 7/0075; H04M 15/57; H04M 15/63; H04M 2215/208
See application file for complete search history.

(56) References Cited

U.S. PATENT DOCUMENTS

2009/0222815 A1* 9/2009 Dake ...................... G06F 9/455 718/1
2011/0314467 A1* 12/2011 Pearson ........................... 718/1
(Continued)

FOREIGN PATENT DOCUMENTS

JP  2005-332223 A  12/2005
JP  2006-238494 A   9/2006
(Continued)

OTHER PUBLICATIONS

International Preliminary Report on Patentability issued Sep. 12, 2014 in PCT/JP2013/054205 filed on Feb. 20, 2013.
(Continued)

*Primary Examiner* — Jung Park
(74) *Attorney, Agent, or Firm* — Oblon, McClelland, Maier & Neustadt, L.L.P.

(57) ABSTRACT

A mobile communication system includes an OpenFlow network and CSCFs. A first CSCF comprises a terminal information assigning unit that assigns information of an incoming terminal of a destination of a signal accommodated in a second CSCF to a header part of a signal destined for the second CSCF. The OpenFlow network comprises a
(Continued)

storage unit that stores a correspondence relationship between the incoming terminal and a device accommodating the incoming terminal, a terminal information acquisition unit that acquires information of the incoming terminal from the header part of the signal, a transmission destination identification unit that identifies the device that is a transmission destination from the information, and an open flow transmission unit that transmits a signal to the identified device.

17 Claims, 5 Drawing Sheets

(51) Int. Cl.
    *H04L 12/741* (2013.01)
    *H04L 12/801* (2013.01)
    *H04W 28/02* (2009.01)
    *H04M 7/00* (2006.01)

(52) U.S. Cl.
    CPC ......... *H04L 65/1016* (2013.01); *H04W 28/02* (2013.01); *H04M 7/006* (2013.01)

(56) References Cited

U.S. PATENT DOCUMENTS

| | | | |
|---|---|---|---|
| 2013/0064243 A1* | 3/2013 | Akiyoshi | 370/389 |
| 2013/0163426 A1* | 6/2013 | Beliveau et al. | 370/235 |
| 2013/0259052 A1* | 10/2013 | Akiyosh | 370/392 |
| 2013/0266017 A1* | 10/2013 | Akiyoshi | 370/392 |

FOREIGN PATENT DOCUMENTS

| | | |
|---|---|---|
| JP | 2006-303754 A | 11/2006 |
| JP | 2007-088607 A | 4/2007 |
| JP | 2007-156569 A | 6/2007 |
| JP | 2008-033558 A | 2/2008 |
| JP | 2011-170718 A | 9/2011 |
| JP | 2012-156877 A | 8/2012 |

OTHER PUBLICATIONS

Written Opinion issued May 14, 2013 in PCT/JP2013/054205 fled on Feb. 20, 2013 (English translation only).
Extended European Search Report issued Sep. 7, 2015 in Patent Application No. 13755545.4.
Satoshi Komorita, et al., "User-transparent Reconfiguration Method for Self-organizing IP Multimedia Subsystem" IEEE Symposium on Computers and Communications (ISCC), XP032018413, 2011, pp. 1137-1144.
Office Action issued Jul. 14, 2015 in Japanese Patent Application No. 2014-502153 (with English language translation).
International Search Report issued May 14, 2013 in PCT/JP2013/054205 filed Feb. 20, 2013.
Nick McKeown, et al., "OpenFlow: Enabling Innovation in Campus Networks" ACM SIGCOMM Computer Communication Review, vol. 38, No. 2, Apr. 2008, pp. 69-74.
Bumpei Yatsu, et al., "An Approach for Using Network Virtualization Technology in Mobile Communication Networks" ICT network Cloud Research Group, Mar. 6, 2012, p. 581 (with partial English language translation).

* cited by examiner

MOBILE COMMUNICATION SYSTEM, COMMUNICATION SYSTEM, NODE, FLOW-CONTROL NETWORK, AND COMMUNICATION-CONTROL METHOD

TECHNICAL FIELD

The present invention relates to a mobile communication system, a communication system, a node and a flow-control network included in the mobile communication system or the communication system, and a communication-control method performed by the same.

BACKGROUND ART

A virtual machine (VM) is conventionally realized by a computer for various purposes using a server virtualization technology (e.g., see Patent Literature 1). Further, using a virtual machine as a node in a core network of a mobile communication network by this technology is under investigation.

CITATION LIST

Patent Literature

[Patent Literature 1] Japanese Patent Laid-Open No. 2005-332223

SUMMARY OF INVENTION

Technical Problem

A server (node) operating in a mobile communication network can be replicated by performing VM replication using the server virtualization technology. However, when this function is used for scale-out, two replicated VMs are the same and an IP address is common between the two replicated VMs. Accordingly, a user cannot be accommodated in an intended server. Further, when separate IP addresses are set in the two VMs again after the scale-out, a method of server awareness (e.g., settings relating to communication between applications) when viewed from a partner device such as a mobile device should be changed.

For example, in a mobile communication network in which a CSCF (Call Session Control Function) of an IMS (IP Multimedia Subsystem) is replaced with a virtualized server, when an incoming-side CSCF accommodating an incoming-side mobile communication terminal is subjected to VM replication for scale-out, an IP address of the incoming-side CSCF is common between two replicated servers. Accordingly, when an origination-side CSCF accommodating an origination-side mobile communication terminal transmits a signal to the incoming-side CSCF, path control based on the IP address cannot be correctly performed and call processing cannot be performed. Therefore, even when a node in the mobile communication network is replicated through the VM replication as described above, for example, purposes such as load balancing based on scale-out are not appropriately achieved.

The present invention has been made in view of the above problems, and an object of the present invention is to provide a mobile communication system, a communication system, a node, a flow-control network, and a communication-control method which are capable of performing appropriate path control for a replicated node when replication of a node is performed in a mobile communication network.

Solution to Problem

In order to achieve the object described above, a mobile communication system according to one embodiment of the present invention is a mobile communication system that provides a mobile communication function to a mobile communication terminal and includes a flow-control network and a node connected to the flow-control network, wherein the node comprises a terminal information assigning means that assigns, to a header part of a signal from the own node to another node, information indicating a mobile communication terminal of a destination or a transmission source of the signal accommodated in the other node; and a transmission means that transmits the signal in which the information indicating a mobile communication terminal is assigned to the header part by the terminal information assigning means to the flow-control network in order to transmit the signal to the other node, and the flow-control network comprises a storage means that stores accommodation device information indicating a correspondence relationship between the mobile communication terminal and a device accommodating the mobile communication terminal among replicated nodes; an open flow reception means that receives the signal destined for the other node that is transmitted from the node; a terminal information acquisition means that acquires the information indicating a mobile communication terminal of a destination or a transmission source of the signal from the header part of the signal received by the open flow reception means; a transmission destination identification means that identifies a device of a transmission destination among other replicated nodes from the information acquired by the terminal information acquisition means with reference to the accommodation device information stored in the storage means; and an open flow transmission means that transmits the signal received by the open flow reception means to the device of a transmission destination identified by the transmission destination identification means.

In the mobile communication system according to one embodiment of the present invention, when the signal is transmitted from one node to the other node, the information indicating a mobile communication terminal of the destination or the transmission source of the signal accommodated in the other node is assigned to the header part of the signal. In the flow-control network of the mobile communication system, the information indicating a mobile communication terminal is acquired from the header part of the signal, and the device of the signal transmission destination among the replicated nodes is identified from the information.

In other words, in the mobile communication system according to one embodiment of the present invention, when the replication of the node is performed, the transmission destination node is identified according to the mobile communication terminal accommodated in the node and the signal transmission is performed. Further, a signal transmission source may not be aware of the replication of the communication partner. Therefore, with the mobile communication system according to one embodiment of the present invention, it is possible to perform appropriate path control for the replicated node when the replication of the node is performed in the mobile communication network.

The terminal information assigning means may assign the information indicating a mobile communication terminal to the header part by rewriting a field indicating the destination in the header part of the signal with the information indicating a mobile communication terminal of a destination or a transmission source of the signal, the storage means may store accommodation node information indicating a correspondence relationship between the mobile communication terminal and the node accommodating the mobile communication terminal among nodes included in the mobile communication system, and the transmission destination identification means may identify the other node of the destination of the signal from the information acquired by the terminal information acquisition means with reference to the accommodation node information stored in the storage means. With this configuration, it is possible to reliably assign the information indicating a mobile communication terminal to the header part of the signal and to reliably identify the other node that is a signal transmission destination. Accordingly, it is possible to reliably implement the present invention.

The terminal information assigning means may also assign information indicating a node number of the other node to the header part of the signal, the terminal information acquisition means may also acquire the information indicating the node number of the other node from the header part of the signal received by the open flow reception means, and the transmission destination identification means may identify the other node of the destination of the signal by additionally using the information indicating the node number of the other node acquired by the terminal information acquisition means. With this configuration, it is possible to more reliably identify the other node that is the signal transmission destination according to the node number of the node and to reliably implement the present invention.

The transmission destination identification means may identify a device of a transmission destination from among the other replicated nodes based on the information in which a bit mask is applied to the information indicating a mobile communication terminal. With this configuration, it is possible to efficiently perform allocation of the signal.

The terminal information assigning means may assign information indicating a session related to the mobile communication terminal of the destination or the transmission source of the signal to the header part of the signal from the own node to another node as the information indicating the mobile communication terminal of the destination or the transmission source of the signal. With this configuration, for example, when the mobile communication terminal of the destination or the transmission source of the signal performs a plurality of communications at the same time, that is, establishes a plurality of sessions at the same time, it is possible to perform path control for each communication (session) of the mobile communication terminal of the destination or the transmission source of the signal.

The node and the flow-control network included in the mobile communication system have a novel configuration and correspond to inventions. In other words, a node according to one embodiment of the present invention is a node in a mobile communication system that provides a mobile communication function to a mobile communication terminal and includes a flow-control network and the node connected to the flow-control network, the node including a terminal information assigning means that assigns, to a header part of a signal from the own node to another node, information indicating a mobile communication terminal of a destination or a transmission source of the signal accommodated in the other node; and a transmission means that transmits the signal in which the information indicating a mobile communication terminal is assigned to the header part by the terminal information assigning means to the flow-control network in order to transmit the signal to the other node.

Further, a flow-control network according to one embodiment of the present invention is a flow-control network in a mobile communication system that provides a mobile communication function to a mobile communication terminal and includes the flow-control network and a node connected to the flow-control network, the flow-control network including: a storage means that stores accommodation device information indicating a correspondence relationship between the mobile communication terminal and a device accommodating the mobile communication terminal among replicated nodes; an open flow reception means that receives the signal destined for the other node that is transmitted from the node; a terminal information acquisition means that acquires the information indicating a mobile communication terminal of a destination or a transmission source of the signal from the header part of the signal received by the open flow reception means; a transmission destination identification means that identifies a device of a transmission destination among other replicated nodes from the information acquired by the terminal information acquisition means with reference to the accommodation device information stored in the storage means; and an open flow transmission means that transmits the signal received by the open flow reception means to the device of a transmission destination identified by the transmission destination identification means.

Incidentally, the present invention may be described not only as an invention of the mobile communication system, the node and the flow-control network as described above, but also as an invention of a communication-control method as follows. This differs only in category, and is substantially the same invention with the same operation and effects.

In other words, a communication-control method according to one embodiment of the present invention is a communication-control method performed by a mobile communication system that provides a mobile communication function to a mobile communication terminal and includes a flow-control network and a node connected to the flow-control network, the communication-control method including: a terminal information assigning step for assigning, by the node, to a header part of a signal from the own node to another node, information indicating a mobile communication terminal of a destination or a transmission source of the signal accommodated in the other node; and a transmission step for transmitting, by the node, the signal in which the information indicating a mobile communication terminal is assigned to the header part in the terminal information assigning step to the flow-control network in order to transmit the signal to the other node; an open flow reception step for receiving, by the flow-control network, the signal destined for the other node that is transmitted from the node; a terminal information acquisition step for acquiring, by the flow-control network, the information indicating a mobile communication terminal of a destination or a transmission source of the signal from the header part of the signal received in the open flow reception step; a transmission destination identification step for identifying, by the flow-control network, a device of a transmission destination among other replicated nodes from the information acquired in the terminal information acquisition step with reference to accommodation device information indicating a correspondence relationship between the mobile communication terminal and a device accommodating the mobile communication terminal among replicated nodes, the accommodation device information being stored in a storage means included in the flow-control network; and an open flow transmission step for transmitting, by the flow-control network, the signal received in the open flow reception step to the device of a transmission destination identified in the transmission destination identification step.

Further, a communication-control method according to one embodiment of the present invention is a communication-control method performed by a node in a mobile communication system that provides a mobile communication function to a mobile communication terminal and includes a flow-control network and the node connected to the flow-control network, the communication-control method including: a terminal information assigning step for assigning, to a header part of a signal from the own node to another node, information indicating a mobile communication terminal of a destination or a transmission source of the signal accommodated in the other node; and a transmission step for transmitting the signal in which the information indicating a mobile communication terminal is assigned to the header part in the terminal information assigning step to the flow-control network in order to transmit the signal to the other node.

Further, a communication-control method according to one embodiment of the present invention is a communication-control method performed by a flow-control network in a mobile communication system that provides a mobile communication function to a mobile communication terminal and includes the flow-control network and a node connected to the flow-control network, the communication-control method including: an open flow reception step for receiving a signal destined for the other node that is transmitted from the node; a terminal information acquisition step for acquiring information indicating a mobile communication terminal of a destination or a transmission source of the signal from a header part of the signal received in the open flow reception step; a transmission destination identification step for identifying a device of a transmission destination among other replicated nodes from the information acquired in the terminal information acquisition step with reference to accommodation device information indicating a correspondence relationship between the mobile communication terminal and a device accommodating the mobile communication terminal among replicated nodes, the accommodation device information being stored in a storage means included in the flow-control network; and an open flow transmission step for transmitting the signal received in the open flow reception step to the device of a transmission destination identified in the transmission destination identification step.

Further, the present invention can be described as inventions of the mobile communication system, the node, the flow-control network and the communication-control method as described above, and can also be described as inventions of a communication system, a node and a flow-control network included in the communication system, and a communication-control method performed by the same, as follows. These are substantially the same inventions as the inventions described above except that the mobile communication terminal is a communication terminal and the mobile communication is communication, and achieve the same operation and effects.

A communication system according to one embodiment of the present invention is a communication system that provides a communication function to a communication terminal and includes a flow-control network and a node connected to the flow-control network, wherein the node comprises a terminal information assigning means that assigns, to a header part of a signal from the own node to another node, information indicating a communication terminal of a destination or a transmission source of the signal accommodated in the other node; and a transmission means that transmits the signal in which the information indicating a communication terminal is assigned to the header part by the terminal information assigning means to the flow-control network in order to transmit the signal to the other node, and the flow-control network comprises a storage means that stores accommodation device information indicating a correspondence relationship between the communication terminal and a device accommodating the communication terminal among replicated nodes; an open flow reception means that receives the signal destined for the other node that is transmitted from the node; a terminal information acquisition means that acquires the information indicating a communication terminal of a destination or a transmission source of the signal from the header part of the signal received by the open flow reception means; a transmission destination identification means that identifies a device of a transmission destination among other replicated nodes from the information acquired by the terminal information acquisition means with reference to the accommodation device information stored in the storage means; and an open flow transmission means that transmits the signal received by the open flow reception means to the device of a transmission destination identified by the transmission destination identification means.

The terminal information assigning means may assign information indicating a session related to the communication terminal of a destination or a transmission source of the signal to the header part of the signal from the own node to the other node as information indicating the communication terminal of a destination or a transmission source of the signal.

A node according to one embodiment of the present invention is a node in a communication system that provides a communication function to a communication terminal and includes a flow-control network and the node connected to the flow-control network, the node including: a terminal information assigning means that assigns, to a header part of a signal from the own node to another node, information indicating a communication terminal of a destination or a transmission source of the signal accommodated in the other node; and a transmission means that transmits the signal in which the information indicating a communication terminal is assigned to the header part by the terminal information assigning means to the flow-control network in order to transmit the signal to the other node.

A flow-control network according to one embodiment of the present invention is a flow-control network in a communication system that provides a communication function to a communication terminal and includes the flow-control network and a node connected to the flow-control network, the flow-control network including: a storage means that stores accommodation device information indicating a correspondence relationship between the communication terminal and a device accommodating the communication terminal among replicated nodes; an open flow reception means that receives the signal destined for the other node that is transmitted from the node; a terminal information acquisition means that acquires the information indicating a communication terminal of a destination or a transmission source of the signal from the header part of the signal received by the open flow reception means; a transmission destination identification means that identifies a device of a transmission destination among other replicated nodes from the information acquired by the terminal information acquisition means with reference to the accommodation device information stored in the storage means; and an open flow transmission means that transmits the signal received by the open flow reception means to the device of a transmission destination identified by the transmission destination identification means.

A communication-control method according to one embodiment of the present invention is a communication-control method performed by a communication system that provides a communication function to a communication terminal and includes a flow-control network and a node connected to the flow-control network, the communication-control method including: a terminal information assigning step for assigning, by the node, to a header part of a signal from the own node to another node, information indicating a communication terminal of a destination or a transmission source of the signal accommodated in the other node; and a transmission step for transmitting, by the node, the signal in which the information indicating a communication terminal is assigned to the header part in the terminal information assigning step to the flow-control network in order to transmit the signal to the other node; an open flow reception step for receiving, by the flow-control network, the signal destined for the other node that is transmitted from the node; a terminal information acquisition step for acquiring, by the flow-control network, the information indicating a communication terminal of a destination or a transmission source of the signal from the header part of the signal received in the open flow reception step; a transmission destination identification step for identifying, by the flow-control network, a device of a transmission destination among other replicated nodes from the information acquired in the terminal information acquisition step with reference to accommodation device information indicating a correspondence relationship between the communication terminal and a device accommodating the communication terminal among replicated nodes, the accommodation device information being stored in a storage means included in the flow-control network; and an open flow transmission step for transmitting, by the flow-control network, the signal received in the open flow reception step to the device of a transmission destination identified in the transmission destination identification step.

A communication-control method according to one embodiment of the present invention is a communication-control method performed by a node in a communication system that provides a communication function to a communication terminal and includes a flow-control network and the node connected to the flow-control network, the communication-control method including: a terminal information assigning step for assigning, to a header part of a signal from the own node to another node, information indicating a communication terminal of a destination or a transmission source of the signal accommodated in the other node; and a transmission step for transmitting the signal in which the information indicating a communication terminal is assigned to the header part in the terminal information assigning step to the flow-control network in order to transmit the signal to the other node.

A communication-control method according to one embodiment of the present invention is a communication-control method performed by a flow-control network in a communication system that provides a communication function to a communication terminal and includes the flow-control network and a node connected to the flow-control network, the communication-control method including: an open flow reception step for receiving a signal destined for the other node that is transmitted from the node; a terminal information acquisition step for acquiring information indicating a communication terminal of a destination or a transmission source of the signal from a header part of the signal received in the open flow reception step; a transmission destination identification step for identifying a device of a transmission destination among other replicated nodes from the information acquired in the terminal information acquisition step with reference to accommodation device information indicating a correspondence relationship between the communication terminal and a device accommodating the communication terminal among replicated nodes, the accommodation device information being stored in a storage means included in the flow-control network; and an open flow transmission step for transmitting the signal received in the open flow reception step to the device of a transmission destination identified in the transmission destination identification step.

Advantageous Effects of Invention

In one embodiment of the invention, when the replication of the node is performed, the transmission destination node is identified according to the mobile communication terminal (communication terminal) accommodated in the node and signal transmission is performed. Further, a signal transmission source may not be aware of the replication of a communication partner node. Therefore, according to one embodiment of the present invention, it is possible to perform appropriate path control for the replicated node when the replication of the node is performed in the mobile communication network (communications network).

DESCRIPTION OF EMBODIMENTS

Embodiments of a mobile communication system, a node, a flow-control network, a call processing node and a communication-control method according to the present invention will be described in detail with reference to the drawings. Further, the same elements are denoted with the same reference signs in the description of the drawings and repeated description is omitted.

Figure 1:
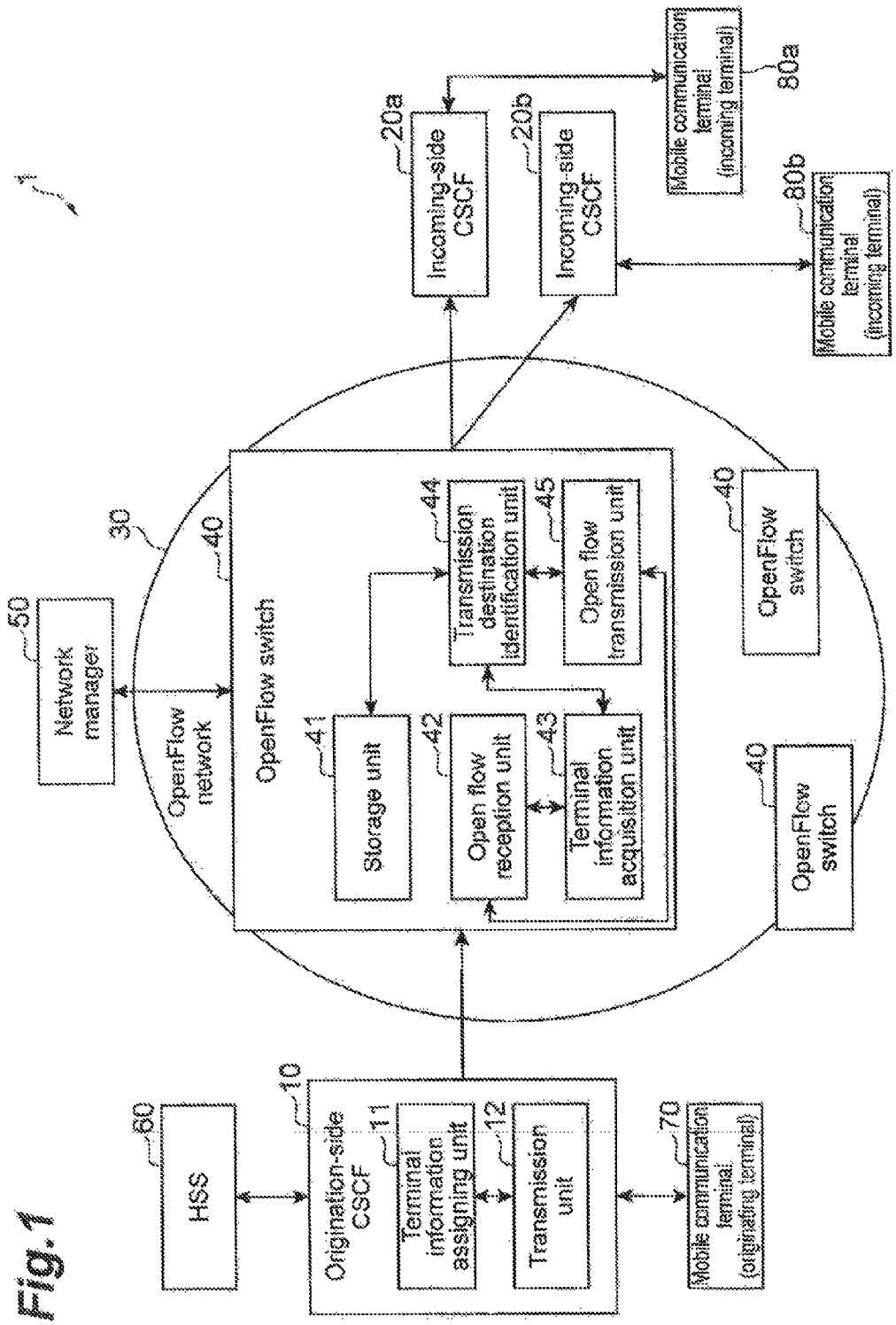
FIG. 1 is a diagram illustrating a configuration of a mobile communication system and a functional configuration of devices constituting the mobile communication system according to an embodiment of the present invention.

A configuration of a mobile communication system 1 according to the present embodiment is illustrated in FIG. 1. This configuration is based on an IMS as an example. A mobile communication system 1 is a system that provides a mobile communication function to mobile communication terminals (mobile devices) 70 and 80 (which collectively refers to 80a, 80b). The mobile communication terminals (mobile devices) 70 and 80 are devices that are used by users and connected to the mobile communication system (mobile communication network) through wireless communication to perform mobile communication. Specifically, the mobile communication terminals 70 and 80 correspond to mobile phones or the like. Further, the mobile communication terminal 80a and the mobile communication terminal 80b are separate mobile communication terminals.

The mobile communication terminal 70 or 80, for example, establishes call connection or other communication connection with the mobile communication terminal 80 or 70 via the mobile communication system 1 or with another device connected via the mobile communication system, and performs communication. The mobile communication terminals 70 and 80 can perform mobile communication when users of the mobile communication terminals 70 and 80 contract with a communication provider of the mobile communication system 1. Further, the mobile communication terminals 70 and 80 may be the same as conventional mobile communication terminals. Further, the case in which call origination is performed from the mobile communication terminal 70 to the mobile communication terminal 80 will be described by way of example in the present embodiment. Here, for convenience, the mobile communication terminal 70 is referred to as an originating terminal 70 and the call mobile communication terminal 80 is referred to as an incoming terminal 80.

The mobile communication system 1 includes CSCFs 10, 20 (which collectively refers to 20a, 20b), an OpenFlow network 30, a network manager 50, and an HSS (Home Subscriber Server) 60, as illustrated in FIG. 1. Further, these configurations 10, 20, 30, 50 and 60 are nodes constituting a core network of the mobile communication system 1 (mobile communication network). Further, the mobile communication system 1 includes, for example, a device included in a not anal mobile communication system, such as a base station and a radio network controller, between the mobile communication terminals 70 and 80 and the CSCFs 10, 20, in addition to the configurations described above.

The CSCFs 10, 20 are call processing nodes that perform control of communication between the mobile communication terminals 70 and 80, and specifically correspond to an SIP (Session Initiation Protocol) server. The mobile communication terminals 70 and 80 that perform communication in the mobile communication system are accommodated in any one of the CSCFs 10, 20. Accommodating the mobile communication terminals 70 and 80 in the CSCFs 10, 20 means, for example, that the CSCFs 10, 20 hold information, such as a subscriber profile, necessary for the mobile communication terminals 70 and 80 to perform communication and manages communication states of the mobile communication terminals 70 and 80. The CSCFs 10, 20 perform call processing, for example, in response to a request from the mobile communication terminals 70 and 80 accommodated therein. Here, the call processing is, for example, a process of establishing call connection between the mobile communication terminals 70 and 80 or a process of disconnecting the call connection. Further, a process for causing the mobile communication terminal to be present in the mobile communication system 1, that is, a position registration process, may be included in the call processing in the present embodiment.

The CSCF 10 or 20 is connected to the other CSCF 20 or 10 via the OpenFlow network 30 as illustrated in FIG. 1, and performs call processing by transmitting and receiving a signal to and from the other CSCF 20 or 10. The CSCFs 10, 20, for example, are realized as virtual machines using a server virtualization technology. The CSCFs 10, 20 are realized by functions of a HW (hardware) layer, a host OS (operating system) layer, a hypervisor layer, a guest OS layer and an APL (application) layer sequentially from a bottom layer. The function of each of these layers is the same as a conventional one.

Further, the CSCFs 10, 20 can be replicated using a server virtualization technology (VM replication). The CSCF 20 is replicated to be two CSCFs 20a, 20b, as illustrated in FIG. 1. Usually, the CSCFs 10, 20 are identified with an IP address or a node number, whereas the respective replicated CSCFs 20a, 20b are not identified with the IP address or the node number but with a VM number, which is identification information (information that identifies the individual replicated CSCFs 20a, 20b), rather than the IP address. Here, for convenience, the CSCF 10 accommodating the originating terminal 70 is referred to as an origination-side CSCF 10, and the CSCF 20 accommodating the incoming terminal 80 is referred to as an incoming-side CSCF 20. The VM number is assigned to enable the replicated CSCFs to be identified, for example, when a CSCF is replicated. The above node number is a number assigned to each node in advance in order to identify nodes in the mobile communication system 1. When the CSCF 20 is scaled out to be the CSCF 20a and the CSCF 20b as described above, a partner node is aware of the CSCF 20 including all the CSCF 20a and the CSCF 20b. The original CSCF 20, and the CSCF 20a and the CSCF 20b all look the same when viewed from the outside (it is not necessary to change, for example, settings of a communication application of the partner node).

When the CSCF 20 is replicated to be the two CSCFs 20a, 20b, each of a plurality of incoming terminals 80 originally accommodated in the CSCF 20 is accommodated in any one of the CSCFs 20a, 20b. Among them, the communication terminal accommodated in the CSCF 20a is referred to as an incoming terminal 80a, and the communication terminal accommodated in the CSCF 20b is referred to as an incoming terminal 80b. Allocation to the individual CSCF 20a and CSCF 20b is performed by the network manager, as will be described below.

The OpenFlow network 30 is a flow-control network connected to, for example, the CSCFs 10, 20 and the network manager 50 and constituting a communication path between those devices. Further, although not illustrated, the OpenFlow network 30 and the mobile communication terminals 70 and 80 may also be connected to each other via a base station (BTS) or a radio network controller (RNC) for transmission and reception of communication data. The OpenFlow network 30 includes OpenFlow switches 40 connected to each other. The OpenFlow network 30 performs transmission and reception of information under control of the network manager 50. Specifically, each OpenFlow switch 40 of the OpenFlow network 30 receives, from the network manager 50, a flow entry indicating a node to which received information is to be transmitted, and performs transmission and reception of information according to the flow entry. How to perform the transmission and reception specifically will be described below. While the OpenFlow network is described in the present description, a network known as an SDN (Softwarer defined network) that performs similar flow control and a flow transfer process according to the control may be used.

The network manager 50 is a control node that controls transmission and reception of information in the OpenFlow network 30. The control, for example, is performed by an OpenFlow controller performing load balancing control included in the network manager 50. The network manager 50 is connected to each of the CSCFs 10, 20 and can perform transmission and reception of the information. Further, the network manager 50 performs an instruction of VM replication to the CSCFs 10, 20 to execute replication of the CSCFs 10, 20 (performs control). Further, the network manager 50 also performs control of hypervisors of the CSCFs 10, 20 which are virtual machines. Further, the VM replication is performed based on input of information to the network manager 50 by the communication provider of the mobile communication system 1, for example, when the CSCFs 10, 20 are scaled out.

The HSS 60 holds data necessary for the mobile communication terminals 70 and 80 to perform communication (perform call processing). For example, the HSS 60 holds a subscriber profile and position registration information for each of the mobile communication terminals 70 and 80. The HSS 60 is connected to the CSCFs 10, 20 (connection between the HSS 60 and the CSCF 20 is omitted in FIG. 1), and the data is referred to and updated by the CSCFs 10, 20, as necessary.

Next, functions according to the present embodiment of the origination-side CSCF 10 and the OpenFlow switch 40 will be described in greater detail. The origination-side CSCF 10 comprises a terminal information assigning unit 11 and a transmission unit 12, as illustrated in FIG. 1. Further, the origination-side CSCF 10 comprises functions usually comprised in a CSCF, in addition to the configuration described above, but description of the functions is omitted.

The terminal information assigning unit 11 is a terminal information assigning means that assigns information indicating the mobile communication terminal 80a, 80b of the destination or the transmission source of a signal accommodated in another node, to the header part of the signal from the own node to the other node. This signal is, for example, an incoming request (INVITE) from the originating terminal 70 to one of the incoming terminals 80a, 80b. The origination-side CSCF 10 receives the incoming request, which is transmitted from the originating terminal 70, via a base station, a radio network controller or the like, which is not illustrated. When the origination-side CSCF 10 receives the incoming request, the origination-side CSCF 10 identifies the incoming terminal 80a, 80b by referring to content of the signal. The origination-side CSCF 10 inquires of the HSS 60 regarding a CSCF in which the incoming terminal 80a, 80b are accommodated (inquiry on whether the terminals are present in an area). Accordingly, the origination-side CSCF 10 recognizes the incoming-side CSCF 20 in which the incoming terminal 80a, 80b is accommodated. In other words, the origination-side CSCF 10 recognizes the other node to which the incoming request is to be transmitted (the HSS 60 responds to only the fact that the incoming terminal 80a or the incoming terminal 80b is accommodated in the CSCF 20 without being aware of virtualization). Further, the replicated incoming-side CSCFs 20a, 20b (individual virtual machines (devices)) are not identified, and the node recognized here is the incoming-side CSCF 20 (all the replicated incoming-side CSCFs 20a, 20b) identified with an IP address (the origination-side CSCF 10 recognizes the node number of the incoming-side CSCF 20 to which the incoming request is to be transmitted). The terminal information assigning unit 11 assigns a call identification number to the incoming request that is a signal destined for the incoming-side CSCF 20 as information indicating the incoming terminal 80a, 80b of the destination of the signal.

Specifically, the terminal information assigning unit 11 rewrites a field indicating the destination in the header part of the IP packet, which is the signal, with the information indicating the mobile communication terminal 80a, 80b of a destination or a transmission source of the signal to assign the information indicating the mobile communication terminal 80a, 80b to the header part. Further, the terminal information assigning unit 11 also assigns the information indicating the node number of the other node that is the destination of the signal to the header part of the signal.

Figure 2:
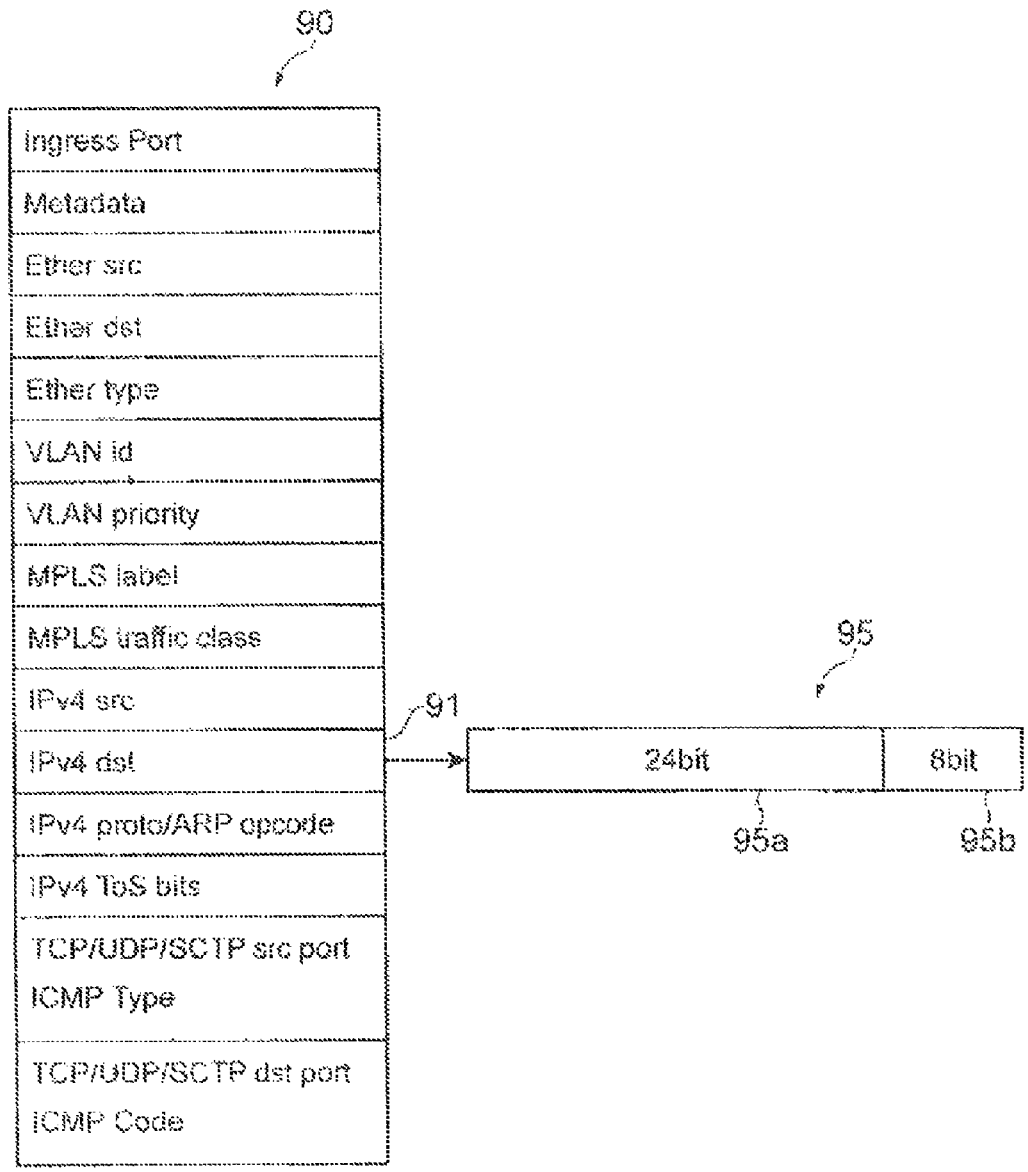
FIG. 2 is a diagram illustrating a header part of a signal transmitted and received in the mobile communication system.

An example of the information of a header part 90 of a signal is illustrated in FIG. 2. This example is an example based on OpenFlow Specification v1.1.0. A field 91 indicating a destination in the header part 90 is a field 91 of "IPv4 dst." An IP address of the CSCF 20 which is a destination of an IP packet is usually included in this field 91. In the present embodiment, the terminal information assigning unit 11 rewrites the information of the field 91 with information 95 including information 95a indicating the node number of the other node that is the destination of the signal, and information 95b indicating the mobile communication terminal 80a, 80b. The information 95a indicating the node number of the other node is included in a 24-bit part of an early part of the field 91, as illustrated in FIG. 2. Specifically, the information 95a indicating the node number of the other node is, for example, "001" when the node is CSCF #1, "002" when the node is CSCF #2, "101" when the node is SGSN #1, and "201" when the node is GGSN #1, and is a numeric value according to a unit of the node of which an application is aware, which does not depend on addition and deletion of a VM.

The information 95b indicating the mobile communication terminal 80a, 80b is included in a part of 8 bits following the information 95a indicating the node number of another node of the field 91, as illustrated in FIG. 2. As the information 95b indicating the mobile communication terminal 80a, 80b, for example, a hash value of an SIP URI related to the mobile communication terminal 80a, 80b (the terminal information assigning unit 11 calculates the hash value) is used. Further, the SIP URI related to the mobile communication terminals 80a, 80b is managed in the origination-side CSCF 10. Alternatively, in the case of IMSI or SIP related to the mobile communication terminals 80a, 80b, this may be generated from a pair of from/to. This information is used for allocation by a virtualization layer. Further, the number of bits of the information 95a indicating the node number and the number of bits of the information 95b indicating the mobile communication terminal 80a, 80b are not necessarily the above values and may be appropriately changed. In the CSCF 10, an application is aware of selection of the node number, but the virtualization layer processes selection of the virtual machine. The application performs only implantation of the call identification number.

The terminal information assigning unit 11 outputs, to the transmission unit 12, the signal in which the field of "IPv4 dst" of the header part 90 has been written.

The transmission unit 12 is a transmission means that transmits the signal input from the terminal information assigning unit 11 to the OpenFlow network 30 in order to transmit the signal to the CSCF 20 that is the other node, which is the destination of the signal.

The OpenFlow switch 40 comprises a storage unit 41, an open flow reception unit 42, a terminal information acquisition unit 43, a transmission destination identification unit 44, and an open flow transmission unit 45, as illustrated in FIG. 1. Further, the OpenFlow switch 40 usually comprises functions comprised in an OpenFlow switch, in addition to the configuration described above, but description of the functions is omitted.

The storage unit 41 is a storage means that stores accommodation device information indicating a correspondence relationship between the mobile communication terminals 70 and 80 and a device accommodating the mobile communication terminals 70 and 80 among the replicated nodes. In the example of the present embodiment, the storage unit 41 stores accommodation device information indicating a correspondence relationship between call identification numbers of the incoming terminals 80a, 80b and the replicated incoming-side CSCFs 20a, 20b. In regard to a signal of which the transmission destination is related to the incoming terminals 80a, 80b, allocation of the incoming-side CSCFs 20a, 20b to which the signal is to be transmitted is performed for based on the accommodation device information. Information to be stored specifically will be described below.

The above accommodation device information specifically corresponds to the flow entry in the OpenFlow network 30. Therefore, the storage unit 41 receives and stores the accommodation device information from the network manager 50. In other words, the network manager 50 controls which of the replicated nodes a signal related to one of the mobile communication terminals 70 and 80 is to be transmitted to (which of the nodes accommodates the mobile communication terminal 70 or 80). The above flow entry is generated by the network manager 50 according to the number and state of replicated nodes, for example, in each certain period of time (e.g., each specific time) or when the state of the node is changed (e.g., when the replication is newly performed), and transmitted to the OpenFlow switch 40. A criterion (implementation scenario) for flow entry generation, for example, is stored in the network manager 50 by a communication provider of the mobile communication system 1 in advance.

Further, the storage unit 41 stores the accommodation node information indicating a correspondence relationship between the mobile communication terminals 70 and 80 and the node accommodating the mobile communication terminals 70 and 80 among the nodes included in the mobile communication system 1. Specifically, the storage unit 41 stores, for example, information indicating a correspondence relationship between hash values of SIP URIs related to the mobile communication terminals 80a, 80b and the CSCFs 20a, 20b as the accommodation node information. As the accommodation node information, a correspondence relationship with the node accommodating the mobile communication terminals 70 and 80 may be stored for each node number of the node. The accommodation node information is information for identifying the incoming-side CSCF 20 (all the replicated incoming-side CSCFs 20a, 20b) of a transmission destination without referring to the "IPv4 dst" of the header information of the signal since the "IPv4 dst" of the header information of the signal is rewritten as described above. The accommodation node information, for example, is acquired from the HSS 60 when the mobile communication terminals 70 and 80 are accommodated in the CSCFs 10, 20 (when a process of causing the terminals to be present in an area is performed).

The open flow reception unit 42 is an open flow reception means that receives a signal destined for another node, which is transmitted from the node in the mobile communication system 1. In the example of the present embodiment, the open flow reception unit 42 receives a signal related to an incoming request from the originating terminal 70 to the incoming terminal 80, which is transmitted from the origination-side CSCF 10 and destined for the incoming-side CSCF 20. The open flow reception unit 42 outputs the received signal to the terminal information acquisition unit 43 and the open flow transmission unit 45.

The terminal information acquisition unit 43 is a terminal information acquisition means that acquires information indicating a mobile communication terminal that is a destination or a transmission source of the signal from the header part of the signal input from the open flow reception unit 42. Further, the terminal information acquisition unit 43 acquires information indicating the node number of the other node that is a destination from the header part of the signal input from the open flow reception unit. Specifically, the terminal information acquisition unit 43 acquires the information from the field 91 of "IPv4 dst" of the header part 90 of the signal illustrated in FIG. 2. The terminal information acquisition unit 43 outputs the acquired information to the transmission destination identification unit 44.

The transmission destination identification unit 44 is a transmission destination identification means that shows a device of a signal transmission destination among the CSCFs 20a, 20b, which are other replicated nodes, from the information input from the terminal information acquisition unit 43 with reference to the accommodation device information stored in the storage unit 41. First, the transmission destination identification unit 44 identifies the incoming-side CSCF 20 (all the replicated incoming-side CSCFs 20a, 20b) that is the other node of the destination of the signal from the node number of the other node input from the terminal information acquisition unit 43 with reference to the accommodation node information stored in the storage unit 41. This is because "IPv4 dst" of the header information of the signal is rewritten as described above and thus the node of the destination of the signal cannot be identified from the header information of the signal. The transmission destination identification unit 44 may also identify the incoming-side CSCFs 20a, 20b based on the information indicating the incoming terminal 80a, 80b (the hash value of SIP URI related to the incoming terminal 80a, 80b) input from the terminal information acquisition unit 43.

The transmission destination identification unit 44 then identifies, as signal transmission destinations, the incoming-side CSCF 20a, 20b associated with the incoming terminal 80a, 80b on the accommodation device information. Specifically, the transmission destination identification unit 44 applies a bit mask to the hash value of the SIP URI and identifies a device (one of the individual incoming-side CSCFs 20a, 20b) of a transmission destination among the replicated incoming-side CSCFs 20a, 20b based on a value of a specific bit of the hash value. In this case, the accommodation device information is information in which content of the specific bit to which the bit mask is applied and the incoming-side CSCF 20a, 20b in which the incoming terminal 80 is accommodated are associated. Alternatively, information in which the hash value of the SIP URI related to the incoming terminal 80 and the incoming-side CSCF 20a, 20b are associated may be used as the accommodation device information. The transmission destination identification unit 44 outputs information indicating the incoming-side CSCF 20a, 20b, which is the identified device of transmission destination of the signal, to the open flow transmission unit 45.

Further, since content (a payload) of the signal is not usually referred to in the OpenFlow switch 40, the mobile communication terminals 70 and 80 that are the destinations or the transmission sources of the signal cannot be identified only by referring to the header information of the signal used in the conventional mobile communication system 1, and the control as in the present embodiment cannot be performed.

Figure 3:
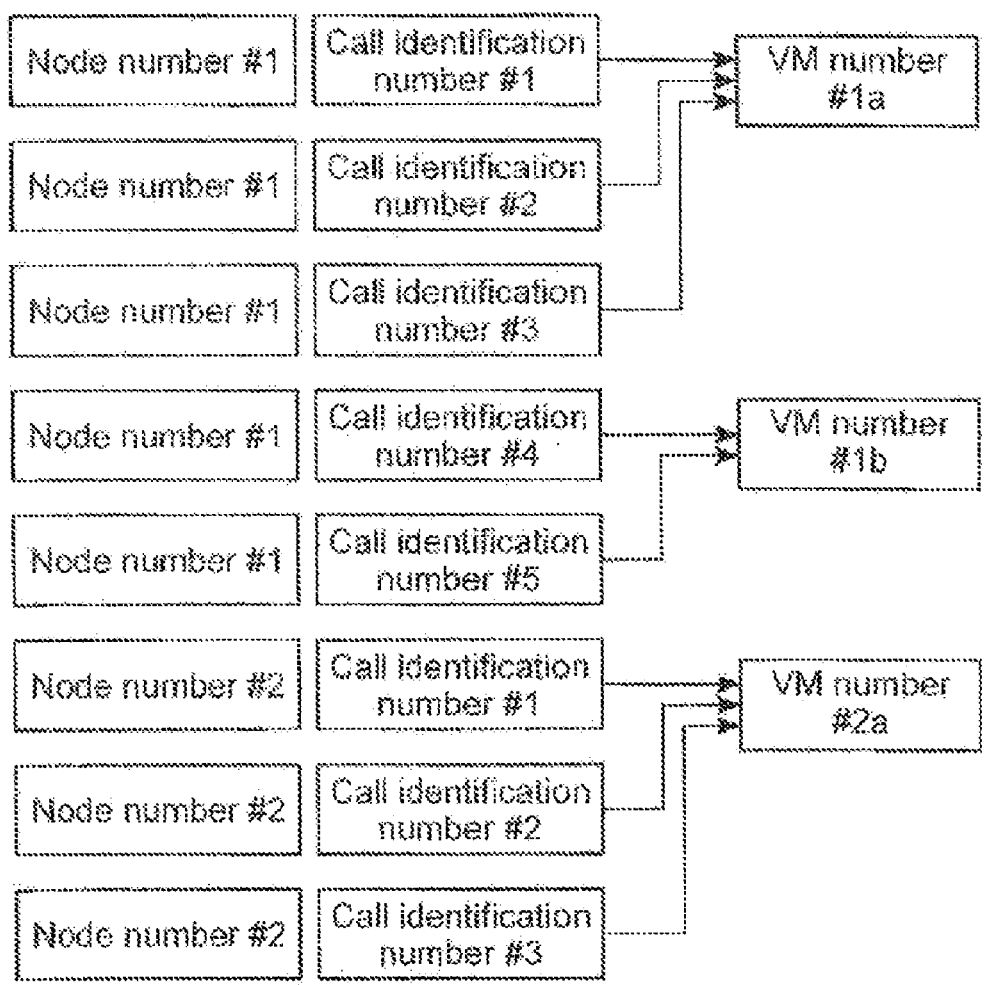
FIG. 3 is a diagram illustrating a correspondence relationship between a node number and a call identification number, and a VM number.

A correspondence relationship between the node number and the call identification number, and the VM number is illustrated in FIG. 3. The node number and the call identification number illustrated on the left of FIG. 3 are information that a signal transmission source sets in the IP header at the time of signal transmission. The VM number illustrated on the right is information assigned to the replicated virtual machine. Further, lines between the node number and the call identification number, and the VM number indicate path control to the virtual machine performed by the network manager 50 in the OpenFlow network 30. In this case, the correspondence relationships between the node number, the call identification number, and the VM number for processing the signal are determined by the network manager 50. In FIG. 3, an example in which two virtual machines (VM numbers #1*a* and #1*b*) are assigned to node number #1 and one virtual machine (VM number #2*a*) is assigned to node number #2 is illustrated. Even when the number of the virtual machines is changed due to scale-out, only the correspondence relationship is changed and thus a process of being aware of the number of virtual machines is not necessary on an origination side.

The open flow transmission unit 45 is an open flow transmission means that transmits the signal input from the open flow reception unit 42 to the incoming-side CSCF 20*a*, 20*b* that is device of transmission destinations identified by the transmission destination identification unit 44. Specifically, the open flow transmission unit 45 performs transmission by sending the signal to a port corresponding to the incoming-side CSCF 20*a*, 20*b*. Further, in the OpenFlow network 30, the OpenFlow switch 40 of an edge directly connected to the incoming-side CSCFs 20*a*, 20*b* writes back "IPv4 dst" of the header information of the signal rewritten by the origination-side CSCF 10 at the time of the transmission with the information (IP address) indicating the incoming-side CSCF 20 (all the replicated incoming-side CSCFs 20*a*, 20*b*) that is information before the rewriting. Accordingly, the CSCFs 20*a*, 20*b* can receive a packet related to the signal. This is a function according to the present embodiment of the origination-side CSCF 10 and the OpenFlow switch 40.

Figure 4:
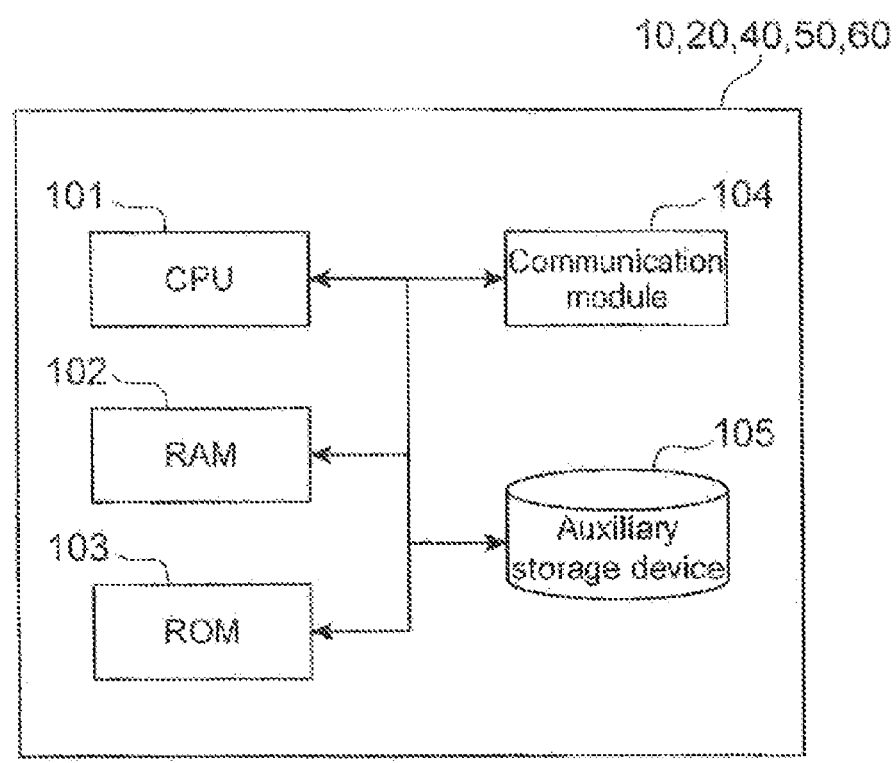
FIG. 4 is a diagram illustrating a hardware configuration of a device constituting the mobile communication system according to an embodiment of the present invention.

A hardware configuration of a server device constituting the CSCFs 10, 20, the OpenFlow switch 40, the network manager 50, and the HSS 60 according to the present embodiment is illustrated in FIG. 4. The server device includes a computer including hardware such as a CPU 101, a RAM (Random Access Memory) 102 and a ROM (Read Only Memory) 103 constituting a main storage device, a communication module 104 for performing communication, and an auxiliary storage device 105 such as a hard disk, as illustrated in FIG. 4. The function of each of the nodes 10, 20, 40, 50 and 60 described above is exhibited by these components operating with a program or the like. This is a configuration of the mobile communication system 1.

Figure 5:
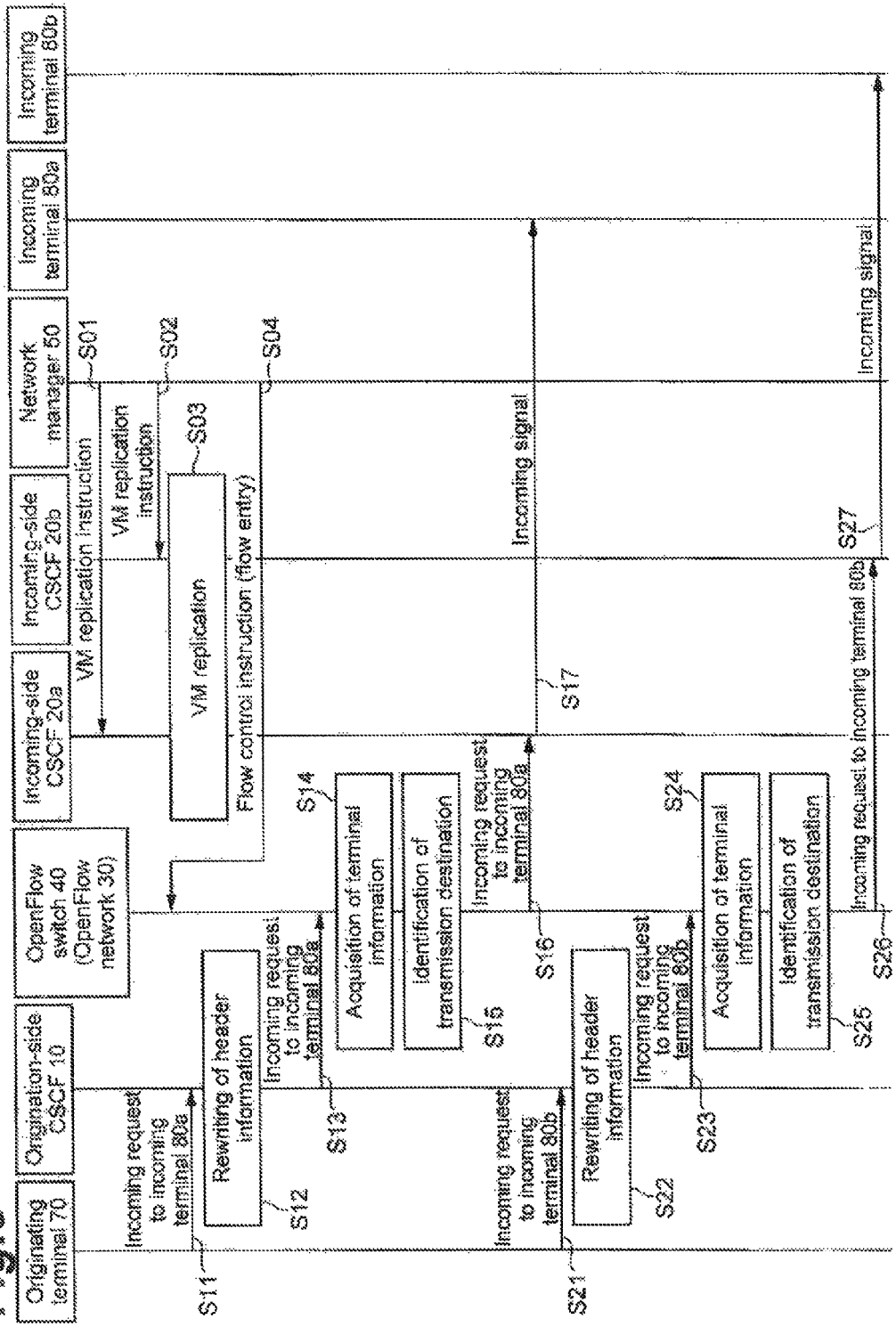
FIG. 5 is a sequence diagram illustrating a process (communication-control method) executed by the mobile communication system according to the embodiment of the present invention.

Next, a communication-control method that is a process executed in the mobile communication system 1 according to the present embodiment will be described using a sequence diagram of FIG. 5. First, a VM replication instruction is performed from the network manager 50 to each of the incoming-side CSCFs 20*a*, 20*b* (S01 and S02). The incoming-side CSCFs 20*a*, 20*b* receiving the VM replication instruction perform a VM replication process (S03). This process is a process in which one of the CSCFs 20*a*, 20*b* replicates the other. The VM replication, for example, is performed when the CSCF 20 is desired to be scaled out. Further, path control cannot be performed using an existing technology since the replicated incoming-side CSCFs 20*a*, 20*b* have the same IP address.

A flow control instruction to the incoming-side CSCF 20 is then performed from the network manager 50 to the OpenFlow switch 40 (OpenFlow network 30) included in the mobile communication system 1 (S04). For example, if a signal is a signal relating to the incoming terminal 80*a*, the path control to the incoming-side CSCF 20*a* is performed, and if the signal is a signal relating to the incoming terminal 80*b*, path control to the incoming-side CSCF 20*b* is performed (control is performed so that the incoming terminal 80*a* is accommodated in the incoming-side CSCF 20*a*, and the incoming terminal 80*b* is accommodated in the incoming-side CSCF 20*b*). Specifically, a flow entry for path control is generated by the network manager 50 as described above and transmitted from the network manager 50 to the OpenFlow switch 40. In the OpenFlow switch 40, the flow entry (the accommodation device information) is received and stored in the storage unit 41. Further, the accommodation node information is stored in the storage unit 41. This is a process before the path control is actually performed.

Here, an incoming request for the incoming terminal 80*a* is performed from the originating terminal 70 to the mobile communication system 1 (mobile communication network). In the origination-side CSCF 10 accommodating the originating terminal 70, the incoming request is received (S11). The received incoming request is input to the terminal information assigning unit 11. In the origination-side CSCF 10, the SIP URI which is information indicating the incoming terminal 80*a* is acquired from the incoming request. Further, the incoming-side CSCF 20 (all the replicated incoming-side CSCFs 20*a*, 20*b*) that is a transmission destination of the incoming request is identified by inquiring of the HSS 60 based on the SIP URI of the incoming terminal 80*a*.

The information of the header part of the signal of the incoming request is rewritten by the terminal information assigning unit 11 based on the above information (S12; terminal information assigning step). Specifically, the hash value of the SIP URI of the incoming terminal 80*a* is calculated, and the field of "IPv4 dst" of the header part is rewritten using the hash value and the information indicating the node number of the incoming-side CSCF 20 (all the replicated incoming-side CSCFs 20*a*, 20*b*) that is the destination of the signal (information indicating the CSCF 20). The signal in which the header part is rewritten is output from the terminal information assigning unit 11 to the transmission unit 12. The incoming request for the incoming terminal 80*a* from the transmission unit 12 to the incoming-side CSCF 20 is transmitted to the OpenFlow network 30 (S13; transmission unit).

The incoming request is then received by the open flow reception unit 42 of the OpenFlow switch 40 on a path from the origination-side CSCF 10 to the incoming-side CSCF 20*a* in the OpenFlow network 30 (S13; open flow reception step). The received signal is output from the open flow reception unit 42 to the terminal information acquisition unit 43 and the open flow transmission unit 45.

The information indicating the incoming terminal 80*a* that is the destination of the signal and the information indicating the node number of the incoming-side CSCF 20 that is the destination are then acquired from the header part of the signal by the terminal information acquisition unit 43 (S14;

terminal information acquisition step). The acquired information is output from the terminal information acquisition unit 43 to the transmission destination identification unit 44.

The accommodation node information and the accommodation device information stored in the storage unit 41 are then referred to and a device of a signal transmission destination among the replicated CSCFs 20a, 20b is identified from the information input from the terminal information acquisition unit 43 by the transmission destination identification unit 44 (S15; transmission destination identification step). Specifically, first, the incoming-side CSCF 20 (all the replicated incoming-side CSCFs 20a, 20b) is identified based on the accommodation node information from the hash value of the SIP URI related to the incoming terminal 80a, 80b and the information indicating the node number of the incoming-side CSCF 20. The incoming-side CSCF 20a that is a device of a transmission destination among the incoming-side CSCFs 20a, 20b is identified based on the accommodation device information from the hash value of the SIP URI related to the incoming terminal 80a, 80b. The information indicating the incoming-side CSCF 20a identified by the transmission destination identification unit 44 is output to the open flow transmission unit 45.

The incoming request related to the incoming terminal 80a is transmitted from the open flow transmission unit 45 to the identified incoming-side CSCF 20a (S16; open flow transmission step). In the incoming-side CSCF 20a, the incoming request is received and the incoming process based on the incoming request is performed. Specifically, the incoming signal is transmitted from the incoming-side CSCF 20a to the incoming terminal 80a (S17), and a subsequent incoming process (not illustrated) is performed. This is a process when the incoming request from the originating terminal 70 to the incoming terminal 80a is performed.

On the other hand, when the incoming request from the originating terminal 70 to the incoming terminal 80b is performed (S21), a process S21-S27, which is the same as the process S11-S17 described above, is performed. Accordingly, the incoming request for the incoming terminal 80b is transmitted from the OpenFlow switch 40 to the incoming-side CSCF 20b and an incoming process is performed by the incoming terminal 80b.

As described above, in the network in which the CSCF of the IMS is replaced with the virtualized server, when the incoming-side CSCFs 20a, 20b are subjected to VM replication, the IP addresses of the incoming-side CSCFs 20a, 20b are common and thus the path control based on the IP address cannot be correctly performed when the origination-side CSCF 10 transmits a signal to the incoming-side CSCFs 20a, 20b. Therefore, call processing cannot be performed.

However, in the present embodiment, when the replication of the incoming-side CSCFs 20a, 20b is performed, any one of the CSCFs 20a, 20b of the transmission destinations is identified according to the incoming terminals 80a, 80b accommodated in the node and signal transmission is performed as described above. Therefore, according to the present embodiment, it is possible to perform appropriate path control for the replicated node when the replication of the node such as the CSCF is performed in the mobile communication network. Accordingly, it is also possible to perform the call processing normally. Further, no separate extension of the OpenFlow switch 40 is necessary, and realization is possible within a range of a standardized specification.

Further, while the replicated nodes are the CSCFs 20a, 20b in the example of the present embodiment, the present invention is also applicable to a case in which any node accommodating a mobile communication terminal is replicated in the mobile communication system.

Further, while the case in which a signal subjected to path control is the incoming request has been described in the present embodiment, control of any other signal may be performed. For example, while a response signal to the incoming request (INVITE) (e.g., 180 ringing) is transmitted from the incoming terminals 80a, 80b to the originating terminal 70, the response signal may be a signal subjected to path control. In this case (when the origination-side CSCF 10 is replicated), the incoming-side CSCFs 20a, 20b assign the information indicating the originating terminal 70 to the header part of the response signal.

Further, while the information indicating the mobile communication terminal 80a, 80b that are the destinations of the signal is assigned to the header part of the signal subjected to path control in the present embodiment, information indicating a mobile communication terminal of a signal transmission source may be assigned to the header part of the signal subjected to path control. In the example of the embodiment described above, since the node that is the destination of the signal is the incoming-side CSCF 20 accommodating the incoming terminals 80a, 80b, the information indicating the incoming terminals 80a, 80b that are signal transmission destinations is assigned. However, when the node that is the destination of the signal is any node accommodating the originating terminal 70 (signal transmission source), information indicating the originating terminal 70 of the signal transmission source is assigned. Information to be assigned may be set in each node in advance, or the terminal information assigning unit 11 may determine whether the node that is the destination of the signal accommodates the destination or the transmission source of the signal, and determine the information based on the determination.

Further, for example, when the mobile communication terminal is registered in the CSCF, the network manager can perform the path control to an intended CSCF using the same scheme. In this case, the mobile communication terminal of the transmission source rewrites the information of the header part of the signal with information indicating the own terminal that is the transmission source.

Further, while the information indicating the mobile communication terminal assigned to the header part of the signal is information that identifies the individual mobile communication terminal in the present embodiment, the information may be information indicating the mobile communication terminal at a level at which the path control is possible. For example, the path control may be performed based on an area to which a user of the mobile communication terminal belongs or a class of the user (subscriber). In this case, information indicating the area or the class may be implanted in the header of the signal (IP packet) as the information indicating the mobile communication terminal to be assigned to the signal. Alternatively, when a plurality of signals are gathered and a process of one group is performed, information like a session ID associated with mobile communication terminals for fastening individual signals and the group process may be implanted in the header of the signal.

When information (session information) indicating the session related to the mobile communication terminal of the destination or the transmission source of the signal like a session ID is used as the information indicating the mobile communication terminal, the terminal information assigning unit 11 has the following function. In other words, the terminal information assigning unit 11, for example, detects the session related to the mobile communication terminal of the destination or the transmission source of the signal to acquire information indicating the session. Further, this session is established in order to perform transmission and reception of a signal using the mobile communication terminal, and is a session in which a signal that is a path control target is transmitted and received. For the detection of the session related to the mobile communication terminal, a conventional method may be used. The terminal information assigning unit 11 then assigns the information indicating the session related to the mobile communication terminal of the destination or the transmission source of the signal to the header part of the signal as the information indicating the mobile communication terminal. The above-described process other than the assignment of the session information to the header part (also including a process in which a unit other than the terminal information assigning unit 11 is mainly involved) may be performed by reading the information indicating the session related to the mobile communication terminal instead of description of the information (e.g., the call identification number) indicating the mobile communication terminal. Accordingly, the path control of the signal according to the session related to the mobile communication terminal is performed.

With this configuration, for example, when the mobile communication terminal of the destination or the transmission source of the signal performs a plurality of communications at the same time, that is, establishes a plurality of sessions at the same time, path control in each communication (session) of the mobile communication terminal of the destination or the transmission source of the signal can be performed.

Further, the field 91 of "IPv4 dst" may be rewritten for the field 91 indicating the destination in the header part 90 of the signal by the info nation indicating the incoming terminals 80*a*, 80*b*, as in the present embodiment. With this configuration, it is possible to reliably assign the information indicating the incoming terminals 80*a*, 80*b* to the header part of the signal and to reliably identify the CSCFs 20*a*, 20*b* that are the signal transmission destinations. Accordingly, it is possible to reliably implement the present invention.

However, for the information indicating the incoming terminals 80*a*, 80*b*, it is not necessarily required to rewrite and implant the destination IP address of the IPv4 header as described above, and the information may be implanted in any parameter that may be designated out as a match field of the OpenFlow. Any parameter that can be referred to for path control of the OpenFlow, including an expanded parameter in a future version of the OpenFlow, may be used. For example, if an IPv6 extended header in the future OpenFlow can be designated in the match field, the information (call identification number) indicating the incoming terminals 80*a*, 80*b* may be implanted into an IPv6 extended header, and a destination address of a basic header may not be rewritten.

Further, the node number of the node may be added to the header information to identify the node of the signal transmission destination, as in the embodiment described above. With this configuration, when the field 91 indicating the destination in the header part 90 of the signal is rewritten, it is possible to more reliably identify the other node that is the signal transmission destination according to units of nodes that the application is aware of, and reliably implement the present invention even when replicated nodes extend across a plurality of nodes or a plurality of types of nodes. However, when it is not necessarily required to distinguish units of nodes, for example, when there is one replicated node of one type, it is not necessary to have the configuration described above.

Further, the replicated device of the transmission destination may be identified based on the information in which the bit mask is applied to the information indicating a mobile communication terminal, as in the present embodiment. With this configuration, it is possible to reduce the number of flows and efficiently perform allocation of signals by bundling the entries of a plurality of mobile communication terminals (users).

While the case in which the present invention is the mobile communication system which provides the mobile communication function to the mobile communication terminal has been described in the embodiment described above, the present invention is not necessarily the mobile communication system. The present invention is applicable to a fixed communication system which provides a fixed communication function to a fixed communication terminal. The fixed communication terminal and the fixed communication system are connected by a cable, unlike the mobile communication system described above. The embodiment described above may be caused to be an embodiment of the fixed communication system according to the present invention by replacing the mobile communication terminal with a fixed communication terminal, the mobile communication with fixed communication and the mobile communication system with a fixed communication system. However, in this case, a specific node corresponds to the fixed communication system. Further, information specific to the mobile communication such as the service area in which the terminal is present in the embodiment described above is unnecessary in the fixed communication system. In addition, the present invention may be implemented in a communication system in which the mobile communication and the fixed communication are both present.

In other words, the present invention is not limited to the mobile communication terminal, the mobile communication and the mobile communication system, and is applicable to any communication terminal, any communication and any communication system as long as these have the same framework as the embodiments described above.

REFERENCE SIGNS LIST

1 . . . Mobile communication system, 10, 20 . . . CSCF (10 . . . Origination-side CSCF, 20 . . . Incoming-side CSCF), 11 . . . Terminal information assigning unit, 12 . . . Transmission unit, 30 . . . OpenFlow network, 40 . . . OpenFlow switch, 41 . . . Storage unit, 42 . . . Open flow reception unit, 43 . . . Terminal information acquisition unit, 44 . . . Transmission destination identification unit, 45 . . . Open flow transmission unit, 50 . . . Network manager, 60 . . . HSS, 70, 80 . . . Mobile communication terminal (70 . . . Originating terminal, 80 . . . Incoming terminal), 101 . . . CPU, 102 . . . RAM, 103 . . . ROM, 104 . . . Communication module, 105 . . . Auxiliary storage device.

The invention claimed is:

1. A mobile communication system that provides a mobile communication function to a mobile communication terminal and includes a flow-control network and a node connected to the flow-control network, wherein the node comprises circuitry configured to
assign, to a header part of a signal from the own node to another node, information indicating a mobile communication terminal of a destination or a transmission source of the signal accommodated in the other node; and transmit the signal in which the information indicating a mobile communication terminal is assigned to the header part to the flow-control network in order to transmit the signal to the other node, and the flow-control network comprises circuitry configured to store accommodation device information indicating a correspondence relationship between the mobile communication terminal and a device accommodating the mobile communication terminal among devices as the other node, the devices having a same function;

receive the signal destined for the other node that is transmitted from the node;

acquire the information indicating a mobile communication terminal of a destination or a transmission source of the signal from the header part of the signal received;

identify a device of a transmission destination among the devices having the same function from the information acquired with reference to the accommodation device information stored; and transmit the signal received to the device of a transmission destination identified, wherein the devices having the same function include one of the devices which is replicated from another of the devices through virtual machine (VM) replication, the mobile communication system performs path control for the other node, and the accommodation device information is changed based on virtual machine replication.

2. The mobile communication system according to claim 1, wherein the node assigns the information indicating a mobile communication terminal to the header part by rewriting a field indicating the destination in the header part of the signal with the information indicating a mobile communication terminal of a destination or a transmission source of the signal, the flow-control network stores accommodation node information indicating a correspondence relationship between the mobile communication terminal and the node accommodating the mobile communication terminal among nodes included in the mobile communication system, and identify the other node of the destination of the signal from the information acquired with reference to the accommodation node information stored.

3. The mobile communication system according to claim 2, wherein the node also assigns information indicating a node number of the other node to the header part of the signal, the flow-control network also acquires the information indicating the node number of the other node from the header part of the signal received, and identifies the other node of the destination of the signal by additionally using the information indicating the node number of the other node acquired.

4. The mobile communication system according to claim 1, wherein the flow-control network identifies a device of a transmission destination among the other nodes having the same function based on the information in which a bit mask is applied to the information indicating a mobile communication terminal.

5. The mobile communication system according to claim 1, wherein the node assigns information indicating a session related to the mobile communication terminal of the destination or the transmission source of the signal to the header part of the signal from the own node to another node as the information indicating the mobile communication terminal of the destination or the transmission source of the signal.

6. A node in a mobile communication system that provides a mobile communication function to a mobile communication terminal and includes a flow-control network, the node connected to the flow-control network, and a device that accommodates the mobile communication terminal among devices having a same function, the flow-control network storing accommodation device information indicating a correspondence relationship between the mobile communication terminal and the device, the node comprising:

circuitry configured to assign, to a header part of a signal from the own node to another node, information indicating a mobile communication terminal of a destination or a transmission source of the signal accommodated in the other node; and transmit the signal in which the information indicating a mobile communication terminal is assigned to the header part to the flow-control network in order to transmit the signal to the other node, wherein the devices having the same function include one of the devices which is replicated from another of the devices through is replicated through virtual machine (VM) replication, the mobile communication system performs path control for the device, and the accommodation device information is changed based on virtual machine replication.

7. A flow-control network in a mobile communication system that provides a mobile communication function to a mobile communication terminal and includes the flow-control network, a node and another node connected to the flow-control network, the flow-control network comprising:

circuitry configured to store accommodation device information indicating a correspondence relationship between the mobile communication terminal and a device accommodating the mobile communication terminal among devices having a same function;

receive the signal destined for the other node that is transmitted from the node;

acquire the information indicating a mobile communication terminal of a destination or a transmission source of the signal from the header part of the signal received;

identify a device of a transmission destination among the devices having the same function from the information acquired with reference to the accommodation device information stored; and transmit the signal received to the device of a transmission destination identified, wherein the devices having the same function include one of the devices which is replicated from another of the devices through virtual machine (VM) replication, the circuitry performs path control for the other node, and the accommodation device information is changed based on virtual machine replication.

8. A communication-control method performed by a mobile communication system that provides a mobile communication function to a mobile communication terminal and includes a flow-control network and a node connected to the flow-control network, the communication-control method comprising:

a terminal information assigning step for assigning, by the node, to a header part of a signal from the own node to another node, information indicating a mobile communication terminal of a destination or a transmission source of the signal accommodated in the other node; and a transmission step for transmitting, by the node, the signal in which the information indicating a mobile communication terminal is assigned to the header part in the terminal information assigning step to the flow-control network in order to transmit the signal to the other node;

an open flow reception step for receiving, by the flow-control network, the signal destined for the other node that is transmitted from the node;

a terminal information acquisition step for acquiring, by the flow-control network, the information indicating a mobile communication terminal of a destination or a transmission source of the signal from the header part of the signal received in the open flow reception step;

a transmission destination identification step for identifying, by the flow-control network, a device of a transmission destination among devices having a same function from the information acquired in the terminal information acquisition step with reference to accommodation device information indicating a correspondence relationship between the mobile communication terminal and a device accommodating the mobile communication terminal among the devices having the same function, the accommodation device information being stored in the flow-control network; and an open flow transmission step for transmitting, by the flow-control network, the signal received in the open flow reception step to the device of a transmission destination identified in the transmission destination identification step, wherein the devices having the same function include one of the devices which is replicated from another of the devices through virtual machine (VM) replication, the method further includes performing path control for the other node, and the accommodation device information is changed based on virtual machine replication.

9. A communication-control method performed by a node in a mobile communication system that provides a mobile communication function to a mobile communication terminal and includes a flow-control network and the node connected to the flow-control network, and an device that accommodates the mobile communication terminal among devices having a same function, the flow-control network storing accommodation device information indicating a correspondence relationship between the mobile communication terminal and the device, the communication-control method comprising:

a terminal information assigning step for assigning, to a header part of a signal from the own node to another node, information indicating a mobile communication terminal of a destination or a transmission source of the signal accommodated in the other node; and a transmission step for transmitting the signal in which the information indicating a mobile communication terminal is assigned to the header part in the terminal information assigning step to the flow-control network in order to transmit the signal to the other node, wherein the devices having the same function include one of the devices which is replicated from another of the devices through is replicated through virtual machine (VM) replication, the method further includes performing path control for the other node, and the accommodation device information is changed based on virtual machine replication.

10. A communication-control method performed by a flow-control network in a mobile communication system that provides a mobile communication function to a mobile communication terminal and includes the flow-control network, a node and another node connected to the flow-control network, the communication-control method comprising:

an open flow reception step for receiving a signal destined for the other node that is transmitted from the node;

a terminal information acquisition step for acquiring information indicating a mobile communication terminal of a destination or a transmission source of the signal from a header part of the signal received in the open flow reception step;

a transmission destination identification step for identifying a device of a transmission destination among devices having a same function from the information acquired in the terminal information acquisition step with reference to accommodation device information indicating a correspondence relationship between the mobile communication terminal and a device accommodating the mobile communication terminal among the devices having the same function, the accommodation device information being stored in the flow-control network; and an open flow transmission step for transmitting the signal received in the open flow reception step to the device of a transmission destination identified in the transmission destination identification step, wherein the devices having the same function include one of the devices which is replicated from another of the devices through virtual machine (VM) replication, the method further includes performing path control for the other node, and the accommodation device information is changed based on virtual machine replication.

11. A communication system that provides a communication function to a communication terminal and includes a flow-control network and a node connected to the flow-control network, and an device that accommodates the mobile communication terminal among devices having a same function, the flow-control network storing accommodation information indicating a correspondence relationship between the mobile communication terminal and the device.

wherein the node comprises circuitry configured to assign, to a header part of a signal from the own node to another node, information indicating a communication terminal of a destination or a transmission source of the signal accommodated in the other node; and transmit the signal in which the information indicating a communication terminal is assigned to the header part to the flow-control network in order to transmit the signal to the other node, and the flow-control network comprises circuitry configured to store accommodation device information indicating a correspondence relationship between the communication terminal and a device accommodating the communication terminal among devices having a same function;

receive the signal destined for the device that is transmitted from the node;
acquire the information indicating a communication terminal of a destination or a transmission source of the signal from the header part of the signal received;
identify a device of a transmission destination among the devices having the same function from the information acquired with reference to the accommodation device information stored; and
transmit the signal received to the device of a transmission destination identified,
wherein the devices having the same function include one of the devices that is replicated from another of the devices through virtual machine (VM) replication,
the mobile communication system performs path control for the other node, and
the accommodation device information is changed based on virtual machine replication.

12. The communication system according to claim 11, wherein the node assigns information indicating a session related to the communication terminal of a destination or a transmission source of the signal to the header part of the signal from the own node to the other node as information indicating the communication terminal of a destination or a transmission source of the signal.

13. A node in a communication system that provides a communication function to a communication terminal and includes a flow-control network, the node connected to the flow-control network, and an device that accommodates the mobile communication terminal among devices having a same function, the flow-control network storing accommodation information indicating a correspondence relationship between the mobile communication terminal and the device, the node comprising:
    circuitry configured to
    assign, to a header part of a signal from the own node to another node, information indicating a communication terminal of a destination or a transmission source of the signal accommodated in the other node: and
    transmit the signal in which the information indicating a communication terminal is assigned to the header part to the flow-control network in order to transmit the signal to the other node,
    wherein the devices having the same function include one of the devices which is replicated from another of the devices through is replicated through virtual machine (VM) replication,
    the communication system performs path control for the other node, and
    the accommodation device information is changed based on virtual machine replication.

14. A flow-control network in a communication system that provides a communication function to a communication terminal and includes the flow-control network, a node and another node connected to the flow-control network to accommodate the communication terminal, the flow-control network comprising:
    circuitry configured to
    store accommodation device information indicating a correspondence relationship between the communication terminal and a device accommodating the communication terminal among devices having a same function;
    receive the signal destined for the other node that is transmitted from the node;
    acquire the information indicating a communication terminal of a destination or a transmission source of the signal from the header part of the signal received;
    identify a device of a transmission destination among the devices having the same function from the information acquired with reference to the accommodation device information stored; and
    transmit the signal received to the device of a transmission destination identified,
    wherein the devices having the same function include one of the devices that is replicated from another of the devices through virtual machine (VM) replication, and
    the communication system performs path control for the other node, and
    the accommodation device information is changed based on virtual machine replication.

15. A communication-control method performed by a communication system that provides a communication function to a communication terminal and includes a flow-control network and a node connected to the flow-control network, the communication-control method comprising:
    a terminal information assigning step for assigning, by the node, to a header part of a signal from the own node to another node, information indicating a communication terminal of a destination or a transmission source of the signal accommodated in the other node; and
    a transmission step for transmitting, by the node, the signal in which the information indicating a communication terminal is assigned to the header part in the terminal information assigning step to the flow-control network in order to transmit the signal to the other node;
    an open flow reception step for receiving, by the flow-control network, the signal destined for the other node that is transmitted from the node;
    a terminal information acquisition step for acquiring, by the flow-control network, the information indicating a communication terminal of a destination or a transmission source of the signal from the header part of the signal received in the open flow reception step;
    a transmission destination identification step for identifying, by the flow-control network, a device of a transmission destination among devices having a same function from the information acquired in the terminal information acquisition step with reference to accommodation device information indicating a correspondence relationship between the communication terminal and a device accommodating the communication terminal among the devices having the same function, the accommodation device information being stored in the flow-control network; and
    an open flow transmission step for transmitting, by the flow-control network, the signal received in the open flow reception step to the device of a transmission destination identified in the transmission destination identification step,
    wherein the devices having the same function include one of the devices that is replicated from another of the devices through virtual machine (VM) replication,
    the method further includes performing path control for the other node, and
    the accommodation device information is changed based on virtual machine replication.

16. A communication-control method performed by a node in a communication system that provides a communication function to a communication terminal and includes a flow-control network and the node connected to the flow-control network, and an device that accommodates the communication terminal among devices having a same function, the flow-control network storing accommodation device information indicating a correspondence relationship between the communication terminal and the device, the communication-control method comprising:

a terminal information assigning step for assigning, to a header part of a signal from the own node to another node, information indicating a communication terminal of a destination or a transmission source of the signal accommodated in the other node; and a transmission step for transmitting the signal in which the information indicating a communication terminal is assigned to the header part in the terminal information assigning step to the flow-control network in order to transmit the signal to the other node, the devices having the same function include one of the devices which is replicated from another of the devices through is replicated through virtual machine (VM) replication, and the method further includes performing path control for the other node, and the accommodation device information is changed based on virtual machine replication.

17. A communication-control method performed by a flow-control network in a communication system that provides a communication function to a communication terminal and includes the flow-control network, a node and another node connected to the flow-control network, the communication-control method comprising:

an open flow reception step for receiving a signal destined for the other node that is transmitted from the node;

a terminal information acquisition step for acquiring information indicating a communication terminal of a destination or a transmission source of the signal from a header part of the signal received in the open flow reception step;

a transmission destination identification step for identifying a device of a transmission destination among devices having a same function from the information acquired in the terminal information acquisition step with reference to accommodation device information indicating a correspondence relationship between the communication terminal and a device accommodating the communication terminal among the devices having the same function, the accommodation device information being stored in the flow-control network; and an open flow transmission step for transmitting the signal received in the open flow reception step to the device of a transmission destination identified in the transmission destination identification step, wherein the devices having the same function include one of the devices that is replicated from another of the devices through virtual machine (VM) replication, the method includes performing path control for the other node, and the accommodation device information is changed based on virtual machine replication.

* * * * *